(12) United States Patent
Isono

(10) Patent No.: US 8,181,358 B2
(45) Date of Patent: May 22, 2012

(54) ENERGY MANAGEMENT APPARATUS AND METHOD

(75) Inventor: Hiroshi Isono, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 752 days.

(21) Appl. No.: 10/557,429

(22) PCT Filed: May 25, 2004

(86) PCT No.: PCT/JP2004/007464
§ 371 (c)(1),
(2), (4) Date: Nov. 21, 2005

(87) PCT Pub. No.: WO2004/113130
PCT Pub. Date: Dec. 29, 2004

(65) Prior Publication Data
US 2007/0056185 A1      Mar. 15, 2007

(30) Foreign Application Priority Data

Jun. 20, 2003  (JP) ................................. 2003-175782

(51) Int. Cl.
*F26B 3/00*    (2006.01)
(52) U.S. Cl. ........................... 34/493; 318/143; 700/295

(58) Field of Classification Search .................. 700/295; 34/493; 180/65.2; 318/143
See application file for complete search history.

(56) References Cited

U.S. PATENT DOCUMENTS
5,788,004 A     8/1998   Friedmann et al.

FOREIGN PATENT DOCUMENTS
| DE | 44 22 329 A1 | 1/1995 |
| JP | A 5-85228 | 4/1993 |
| JP | A 8-507671 | 8/1996 |
| JP | A-2001-245404 | 9/2001 |
| JP | A 2003-47110 | 2/2003 |

*Primary Examiner* — Kakali Chaki
*Assistant Examiner* — Tejal Gami
(74) *Attorney, Agent, or Firm* — Oliff & Berridge, PLC

(57) ABSTRACT

An energy management apparatus manages energy consumption of a machine, which has a supply part (14) for supplying energy and a consume part (10) for consuming the energy supplied by the supply part, so that the energy consumed by the consume part is positively saved. An operating part operates the consume part by using the energy supplied by the supply part. An acquisition part acquires an energy conversion characteristic, as an energy efficiency, from an input energy (40), (42) supplied to the consume part into an output energy output (44), (46) from the consume part. A change part changes an operating condition of the consume part based on the acquired energy efficiency so as to improve an actual value of the energy efficiency.

21 Claims, 7 Drawing Sheets

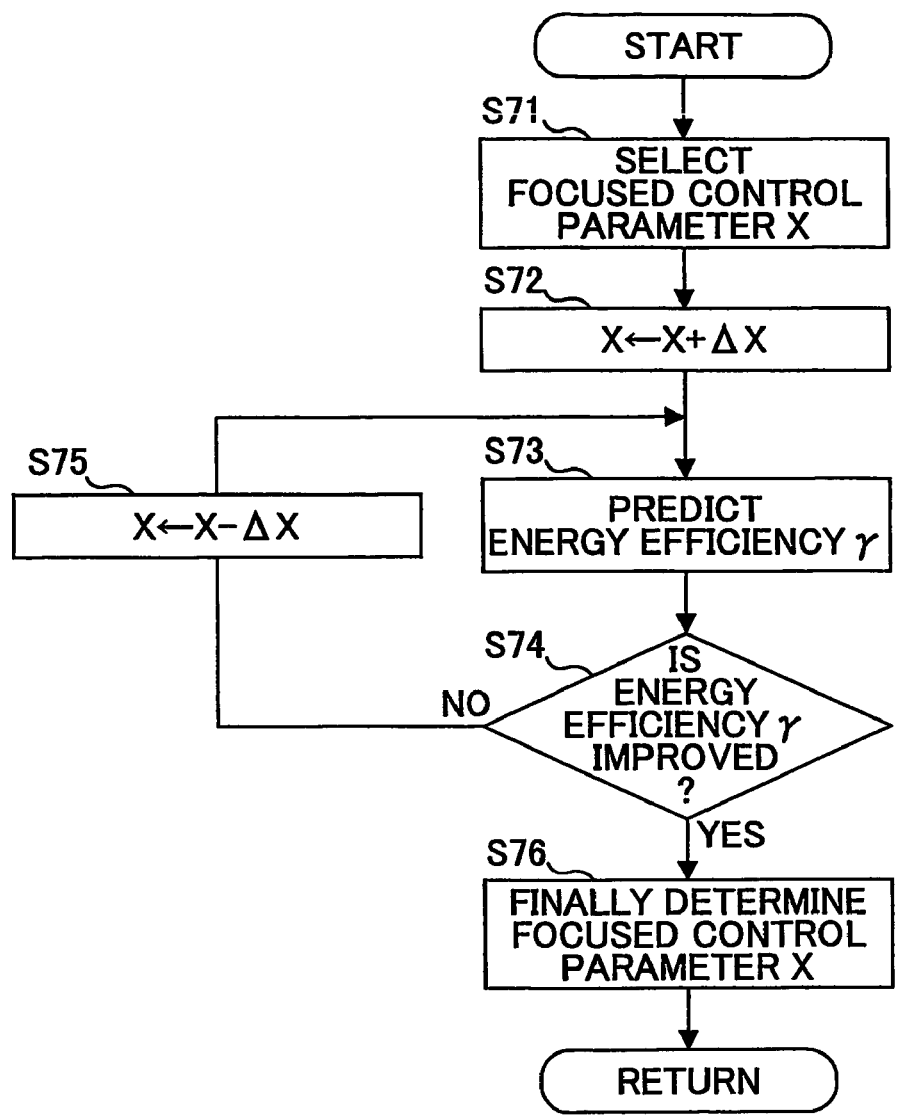

ENERGY MANAGEMENT APPARATUS AND METHOD

TECHNICAL FIELD

The present invention relates to energy management techniques and, more particularly, to an energy management technique to manage energy consumption of a machine having an energy supply part and an energy consuming part that consumes energy supplied by the energy supplying part.

BACKGROUND ART

There is known a technique of managing energy in a machine, which has a supply part for supplying energy and a consume part for consuming the energy supplied by the supply part. Such a technique is disclosed in, for example, Japanese Laid-Open Patent Application No. 8-507671. One example of the supply part is a battery cell as an electric-energy accumulating part, and another example is a generator as an electric-energy generating part. On the other hand, one example of the consume part is an electric motor that is driven to provide a drive force to a machine.

In a machine that performs a work, energy is consumed to as to perform the work. The energy to perform a work may be supplied to the machine from outside, or the machine itself has an energy source to supply a necessary energy by itself. In any case, energy consumed by a machine is limited, and, thus, there is a great demand for saving energy while achieving a target operating condition. Therefore, there is a strong demand for the same machine to achieve both a target operation condition and energy saving.

There may be a case in which the above-mentioned machine has a plurality of actuators that may be driven simultaneously. In such as case, it is not easy to achieve both the target operating condition and the saving of energy consumption. It is theoretically possible to set the capacity of an energy source beforehand so that an energy source does not deplete even if all the actuators are driven simultaneously. However, judging from economical viewpoints or physical viewpoints such as weight, size, etc., it cannot be said that the above-mentioned means is a realistic solution.

There is a technique to comprehensively manage a plurality of actuators provided in an automobile as a machine using fuel as an energy source. In the case of an automobile, the plurality of actuators are an engine, a braking apparatus, a driving apparatus, a steering apparatus, etc. Such a technique is disclosed in, for example, Japanese Laid-Open Patent Application No. 5-85228.

The inventors have researched and investigated an energy management technique for a machine having a supply part for supplying energy and a consume part for consuming the energy supplied by the supply part, and acquired the following knowledge and information.

That is, since the consume part is provided in the machine for the purpose of achieving a certain target, and also driven by energy supplied by the supply part, it is desirous to achieve both the requirements from machine operation and the energy saving by the consume part. Additionally, in order to determine whether or not the consume part is driven so that the consumed energy is actually saved, it is important to monitor the actual energy efficiency of the consume part.

DISCLOSURE OF THE INVENTION

It is a general object of the present invention to provide an improved and useful energy management apparatus in which the above-mentioned problems are eliminated.

A more specific object of the present invention is to provide an energy management apparatus which manages energy consumption of a machine, which has a supply part for supplying energy and a consume part for consuming the energy supplied by the supply part, so that the energy consumed by the consume part is positively saved.

In order to achieve the above-mentioned objects, there are provided according to the present invention energy management apparatus and method as mentioned below.

1) An energy management apparatus that manages energy consumed in a machine having a supply part that supplies an energy and a consume part that consumes the energy supplied by the supply part, the energy management apparatus comprising: an operating part that operates the consume part by using the energy supplied by the supply part; an acquisition part that acquires an energy conversion characteristic, as an energy efficiency, from an input energy supplied to the consume part into an output energy output from the consume part; and a change part that changes an operating condition of the consume part based on the acquired energy efficiency so as to improve an actual value of the energy efficiency.

According to the present invention, the operating condition of the consume parts are changed in accordance with the energy efficiency of the consume part so that the actual value of the energy efficiency is improved. Therefore, according to the present invention, it becomes possible to optimize the operating condition of consume part so as to save energy consumed by the consume part.

It is preferable that the change part according to the present invention changes the operating condition of the consume part while maintaining an actual output of the consume part, that is, maintaining a degree of achievement of an operation request to the consume part. The energy efficiency according to the present invention can be acquired, for example, by dividing an output energy by an input energy, or subtracting the output energy from the input energy. That is, the energy efficiency can be acquired as a proportionality relationship or a difference relationship between an input energy and an output energy.

The supply part according to the present invention may comprise at least one of an accumulation part that accumulates energy and a generation part that generates energy. An example of the accumulation part is a battery, and an example of the generation part is a dynamo. An example of the operation condition according to the present invention is an operation mode for operating the consume part, and another example is a target value (desired value) of energy consumed by the consume part.

The machine referred to in the present invention may be a movable body that is movable by itself, a drive apparatus that drives another object, or an electric equipment installed in a house, a company office, a plant, etc. The movable body may be an automobile, a motorcycle, a railway vehicle, a ship, an aircraft, a rocket, etc.

2) The above-mentioned energy management apparatus may further comprise first change permission/prohibition means for permitting the change part to change the operating condition when at least one condition is established cumulatively, and for prohibiting the change of the operating condition when the at least one condition is not established, wherein the at least one condition includes a condition that a difference between an operation request to the consume part and an actual output from the consume part is equal to or smaller than a specified value.

According to the above-mentioned invention, the operating condition of the consume part is changed when at least the condition that the difference between the operation request to the consume part and the actual output of the consume part is equal to or smaller than a specified value is established, that is, when the condition that the operation request to the consume part is substantially achieved is established. Therefore, according to the above-mentioned invention, both the operation request and the energy consumption saving can be achieved easily for the same consume part.

3) The above-mentioned energy management apparatus may further comprise second change permission/prohibition means for permitting or prohibiting the change part to change the operating condition in accordance with the acquired energy efficiency.

The energy efficiency of the consume part is a physical amount by which whether or not a change in the operating condition is needed irrespective of whether the kind of energy used by the consumed part is electric energy, mechanical energy, combustion energy, thermal energy, or optical energy. According to the above-mentioned knowledge, in the present invention, the change in the operation condition of the consume part is permitted or prohibited in accordance with the energy efficiency of the consume part.

4) The above-mentioned energy management apparatus may further comprise means for permitting the second change permission/prohibition means to change the operating condition when at least one condition is established, and for prohibiting the change of the operating condition when the at least one condition is not established, wherein the at least one condition includes a condition that the acquired energy efficiency is not equal to an upper limit value at which there is substantially no room for improvement.

Accordingly, the change in the operating condition is permitted when at least the condition that the acquired energy condition is not the limit value at which there is no room for improvement is established, that is, when there is a room for improvement of the energy efficiency. Otherwise, the change in the operating condition is prohibited. Therefore, according to the present invention, the change in the operating condition is not unnecessarily performed when there is no room for improvement of the energy efficiency.

5) In the energy management apparatus according to the present invention, the machine may include an operating part that is operated by the consume part, and the acquisition part may include output energy acquisition means for acquiring the output energy in accordance with an amount of operation of the operating part, wherein the management apparatus may further comprise a determination part that determined whether or not an energy transmission system, which is provided between the consume part and the operating part, is abnormal.

Accordingly, when an abnormality that prevent an energy transmission is present between the consume part and the operation part, the abnormality can be detected.

6) In the energy management apparatus according to the present invention, the determination part may include means for determining that said energy transmission system is abnormal when a plurality of conditions including a condition that said acquired energy condition is the upper limit value where there is substantially no room for improvement and a condition where the acquired energy efficiency is equal to or smaller than the specific value.

It is highly possible that the reason for the energy efficiency of the consume part being equal to or smaller than the specific value despite that the energy efficiency is equal to the upper limit, which indicates that there is no room for improvement, does not lie in the consume part itself but lies in the energy transmission system between the consume part and the operation part. Based on the above-mentioned knowledge, according to the present invention, it is determined that the energy transmission system is abnormal when a plurality of conditions are cumulatively established that the energy efficiency of the consume part is equal to the upper limit value where there is no room for improvement and that the acquired energy efficiency is equal to or smaller than the specified value. Therefore, according to the present invention, it is possible to detect an abnormality in the energy transmission system.

7) In the energy management apparatus according to the present invention, the machine may be a movable body, and the consume part may include at least one of an actuator being associated with driving of the movable body, an actuator being associated with braking of the movable body and an actuator being associated with changing of a moving direction of the movable body.

The actuator can be, for example, a motor that consumes electric energy or an engine driven by combusting a fuel as energy. The motor may be an actuator that converts electric energy into mechanical energy. On the other hand, the engine may be an actuator that converts combustion energy into mechanical energy. The actuator being associated with driving of the movable body may include an engine or a motor as a power source actuator that generates a drive force of the movable body, and further include an actuator used in a transmission mechanism (including, for example, a motor for electric transmission or a solenoid valve for fluid transmission). Additionally, the actuator being associated with braking of the movable body may include, for example, a motor and a solenoid valve for fluid pressure control. The actuator being associated with the changing of a moving direction of the movable body may include, for example, a motor to generate a force to change a direction of movement of the movable body.

8) In the energy management apparatus according to the present invention, the consume part may include a plurality of actuators so that the supply part supplies energy commonly to the plurality of actuators, and the operating part may include means for calculating a target value necessary for an operation of each of the actuators while adopting a power or work as a unit common to other actuators.

In the above-mentioned apparatus, in viewpoints of a power or work volume of a plurality of actuators, the operation (drive) of the plurality of actuators is comprehensively controlled. On the other hand, there is a condition established that smaller the power or work volume smaller the energy consumption in the relationship between the power or work volume and the energy consumption. Therefore, according to the present invention, optimization of the plurality of actuators can be possible in viewpoints of energy consumption saving by a plurality of actuators when an attention is given to the power or work volume of each of the actuators.

The power referred to in the present invention means a work volume per unit time. When each actuator converts an electric energy into a mechanical energy, the "power" is represented as an electric power if attention is paid to electric power (input side of the actuator). On the other hand, the "power" is represented as a drive power (efficiency or horse power) if an attention is given to a mechanical energy.

The electric power is an electrical power and is computed as a product of a voltage and a current. For example, if the above-mentioned machine is a movable body moved by an actuator as an automobile, the power is computed, for example, as a product of a force exerted on the movable body by the actuator and a velocity of the movable body. The "work volume" means a time integral of a power. If the power is an electric power, it is expressed as an electric power (or a wattage). As the plurality of actuators, there are selected an actuator for a drive apparatus for driving an automobile, an actuator for an electric steering apparatus that steers an automobile, an actuator for an electric brake that controls an automobile, an actuator for air conditioning in a compartment of an automobile, a light for illuminating an interior or an exterior of a automobile.

9) The energy management apparatus according to the present invention may further comprise an operation request determining device that determines the operation request to said consume part, and wherein said operating part may include means for operating said consume part in accordance with the operation request determined by said operation request determining device.

The operation request referred to in the present invention means an amount of change in a force or acceleration exerted on the machine or a movable part in a direction parallel to or perpendicular to the moving direction of the machine or the movable part, or means a change in the velocity of the machine or the movable part.

10) In the above-mentioned energy management apparatus, the operation request determining device may include: information detector that detects operation information containing at least one of an instruction made by a driver operating said consume part, an operational state of said consume part and an operation circumstance of said consume part; and operation request determination means for determining said operation request in accordance with the operation information detected by said information detector.

11) In the energy management apparatus according to the present invention, the change part may change the operating condition of the consume part in accordance with the acquired energy efficiency so that the actual value of the energy efficiency becomes equal to an upper limit value at which there is substantially no room for improvement.

12) In the energy management apparatus according to the present invention, the change part may change the operating condition of the consume part in accordance with the acquired energy efficiency so that the actual value of the energy efficiency becomes equal to an upper limit value at which there is substantially no room for improvement and greater than a specified value.

13) An energy management method of managing energy consumed in a machine having a supply part that supplies an energy and a consume part that consumes the energy supplied by the supply part, the energy management method comprising: an operating step of operating the consume part by using the energy supplied by the supply part; an acquiring step of acquiring an energy conversion characteristic, as an energy efficiency, from an input energy supplied to the consume part into an output energy output from the consume part; and a changing step of changing an operating condition of the consume part based on the acquired energy efficiency so as to improve an actual value of the energy efficiency.

Other objects, features and advantages of the present invention will become more apparent from the following detailed description when read in conjunction with the accompanying drawings.

BRIEF DESCRIPTION OF THE DRAWINGS

FIG. 7 is a flowchart of an operation according to an operation mode change program.

BEST MODE FOR CARRYING OUT THE INVENTION

A description will now be given, with reference to the drawings, of an energy management apparatus according to an embodiment of the present invention.

Figure 1:
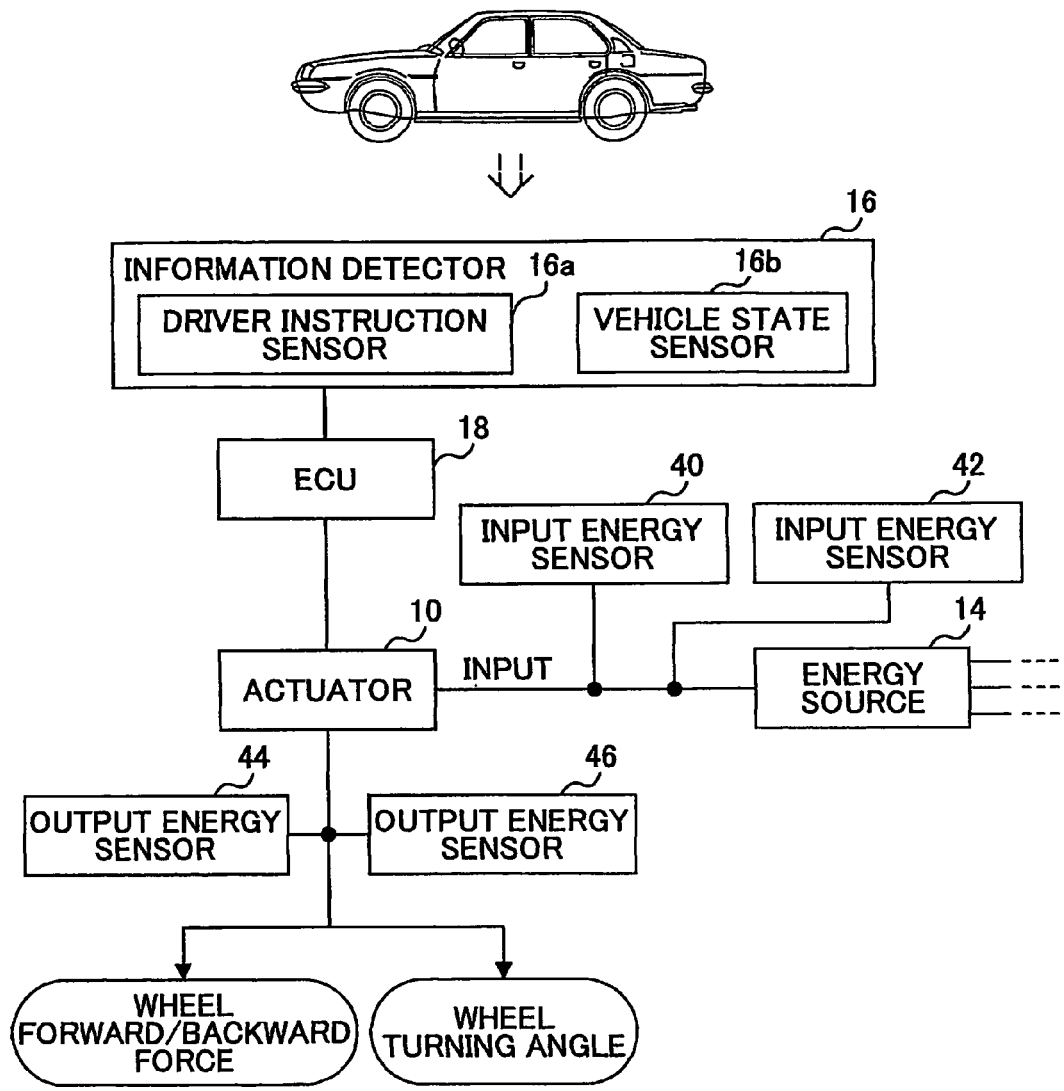
FIG. 1 is a block diagram of a drive control system serving as an energy management apparatus according to the present invention.

FIG. 1 is a block diagram of a drive control system serving as an energy management apparatus according to the present invention. The drive control system shown in FIG. 1 is mounted in an automobile (hereinafter may be referred as "vehicle") as a movable body, which is an example of machines. The automobile is equipped with a plurality of actuators 10 (only one actuator 10 is shown in FIG. 1 for the sake of simplification). The automobile is further equipped with an energy source 14 that supplies energy to each of the actuators 10. As the energy source 14, a fuel, a battery cell, a fuel cell, or an engine (internal combustion engine) may be used. The plurality of actuators 10 provided in the automobile may include the following actuators.

(1) An engine which generates a mechanical energy by combusting a fuel.

(2) A brake actuator using an electric energy so as to control a friction-type brake that brakes each wheel of a vehicle.

(3) A steering actuator using an electric energy so as to control an electrically driven steering apparatus that steers a vehicle.

(4) A vehicle motor using an electric energy so as to drive a vehicle.

(5) A CVT motor using an electric energy so as to control a change gear ratio of an electric CVT apparatus that transmits a driving torque of a vehicle motor to each drive wheel.

(6) A vehicle light using an electric energy so as to generate a light.

(7) An air-conditioner actuator using an electric energy so as to control a temperature and humidity of a compartment of a vehicle.

The brake actuator comprises, for example, a motor serving as a drive source of a brake and solenoid valves that control a pressure transmitted from a pressure source to the brake. The vehicle motor serves as a power source of a vehicle when accelerating a vehicle, and also serves as a generator (regenerative motor or brake motor) when decelerating the vehicle.

The automobile shown in FIG. 1 is equipped with a regenerative brake apparatus for regeneration to recover an electric energy generated by a vehicle motor and store the recovered electric energy in the energy source 14. Therefore, the vehicle motor is positioned not only as the energy consume part but also as a temporary energy generation part.

The air-conditioner has a cooling unit that cools a compartment of a vehicle, and a drive unit for the cooling unit is the air-conditioner actuator. The air-conditioner actuator is, for example, a motor which drives a compressor of the cooling unit.

As shown in FIG. 1, this drive control system comprises an information detector 16, which detects operation information. The information detector 16 is provided so as to detect drive instructions from a driver of a vehicle and states and conditions of the vehicle. The drive instructions are supplied by the driver so that the driver can appropriately drive the vehicle. The "driver instructions" include, for example, an instruction regarding an acceleration of the vehicle, an instruction regarding a deceleration or braking, an instruction regarding steering, etc.

Specifically, the information detector 16 comprises a driver instruction sensor 16a for detecting the driver instructions and a vehicle state sensor 16b for detecting a state of the vehicle.

The driver instruction sensor 16a detects, as a driver instruction, an amount of operation performed by a driver on an operation system of a vehicle, such as a steering operation member, a brake operation member or an accelerator operation member. The vehicle state sensor 16b detects, as a vehicle state, various states or conditions of the vehicle such as a vehicle speed, a vehicle driving force, a vehicle body acceleration (acceleration in a longitudinal direction, a transverse directions or a vertical direction, and includes a deceleration), a wheel speed, a wheel deceleration, a steering angle, a yaw rate, a force or a torque exerted on each wheel, a wheel turning angle, etc.

Figure 2:
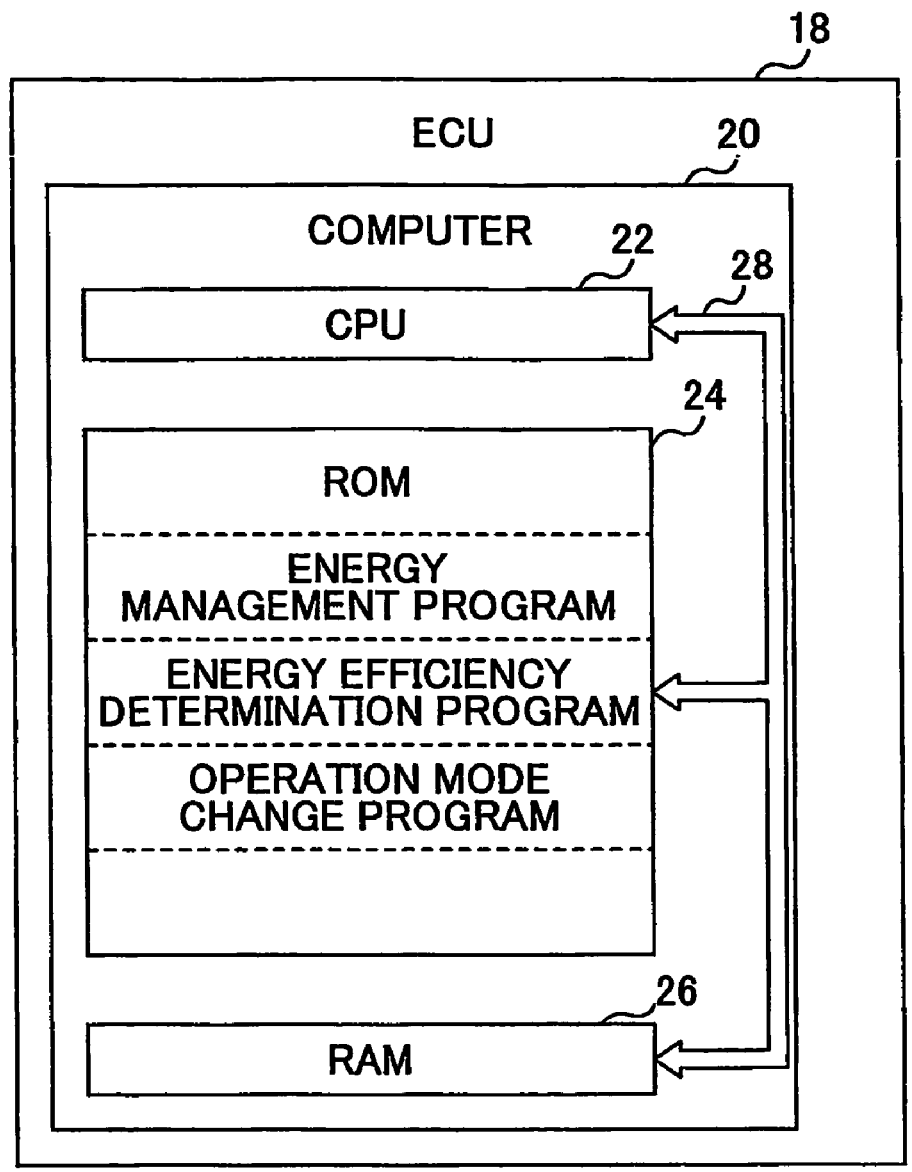
FIG. 2 is a block diagram showing a conceptual hardware structure of an engine control unit (ECU) shown in FIG. 1.

The drive control system is further equipped with an electronic control unit 18 (hereinafter referred to as "ECU"). FIG. 2 is a block diagram showing a conceptual hardware structure of the ECU 18.

The ECU 18 is constituted by mainly a computer 20. The computer 20 comprises, as is well-known, a central processing unit (CPU) 22, a read only memory (ROM) 24 and a random access memory (RAM) 26, which are connected to each other through a bus 28. Various programs such an energy management program, an energy efficiency determination program, operation mode change program, etc., are previously stored in the ROM 24. As shown in FIG. 1, the drive control system comprises an input energy sensors 40 and 42 and output energy sensors 44 and 46 for each actuator 10. The reason for providing two input energy sensors and two output energy sensors for each actuator 10 is that a redundancy design is applied to each energy sensor.

However, it is not indispensable to design the input energy sensors 40 and 42 so that detected physical amounts directly detected by the sensors accurately match each other regarding their kinds. If each of the input energy sensor 40 and 42 is normal, the input energy sensors 40 and 42 is capable of detecting different kinds of physical amounts separately as long as a condition that the values detected by the sensors satisfy a known relationship. This is also applied to the output energy sensors 44 and 46.

Each of the input energy sensors 40 and 42 is provided for detecting an input energy Ein from the energy source 14 to a corresponding one of the actuators 10. Specifically, each of the input energy sensors 40 and 42 detects a power consumption as an input energy Ein when the corresponding actuator 10 is of a type consuming an electric energy, or detects a reduced heat (calorie) or an amount to fuel consumption (volume or weight) as an input energy Ein when the corresponding actuator 10 is of a type consuming a combustion energy (fuel combustion).

It should be noted that, in the present specification, the term "energy" can be interpreted as a narrowly-interpreted electronic power (power) or a broadly-interpreted electric power that is the narrowly-interpreted electric power and a narrowly-interpreted electric energy (work volume). The interpretation of the term "energy" depends on the contents of recitation containing the term.

On the other hand, each of the output energy sensors 44 and 46 in provided for detecting an output energy Eout of the corresponding actuator 10. Specifically, each of the output energy sensors 44 and 46 is provided for detecting a power actually generated by an operation of the corresponding actuator 10. When the actuator 10 is of a type outputting a mechanical energy, a power is detected as a product of a force (or torque) exerted on an object (wheel or vehicle body) driven by the actuator 10 and a velocity of the object. When the object is the vehicle itself, a power is detected as a product of a force or acceleration exerted on the vehicle and a vehicle velocity that is a running speed of the vehicle.

Therefore, when the actuator 10 is of a type outputting a mechanical energy, each of the output energy sensors 44 and 46 is constituted to include at least one of various sensors such as a force sensor, an acceleration sensor, a velocity sensor, a displacement sensor, etc. On the other hand, when the actuator 10 is of a type outputting a heat energy (heating or cooling), each of the output energy sensors 44 and 46 is constituted to include a temperature sensor, for example, in order to grasp the heat (calorie) as the output energy Eout.

Although a plurality of actuators provided in the vehicle can be used for various applications in the vehicle, the actuators 10 according to the preset embodiment are designed to include an actuator for controlling a wheel forward/backward force of the vehicle (for example, engine, vehicle motor and brake actuator) and an actuator for controlling a wheel turning angle (for example, steering actuator). When these actuators are driven, as shown in FIG. 1, the influence appears in the wheel forward/backward force of wheels and the wheel turning angle, and, thereby, a movement (behavior or attitude) of the vehicle is controlled.

Figure 3:
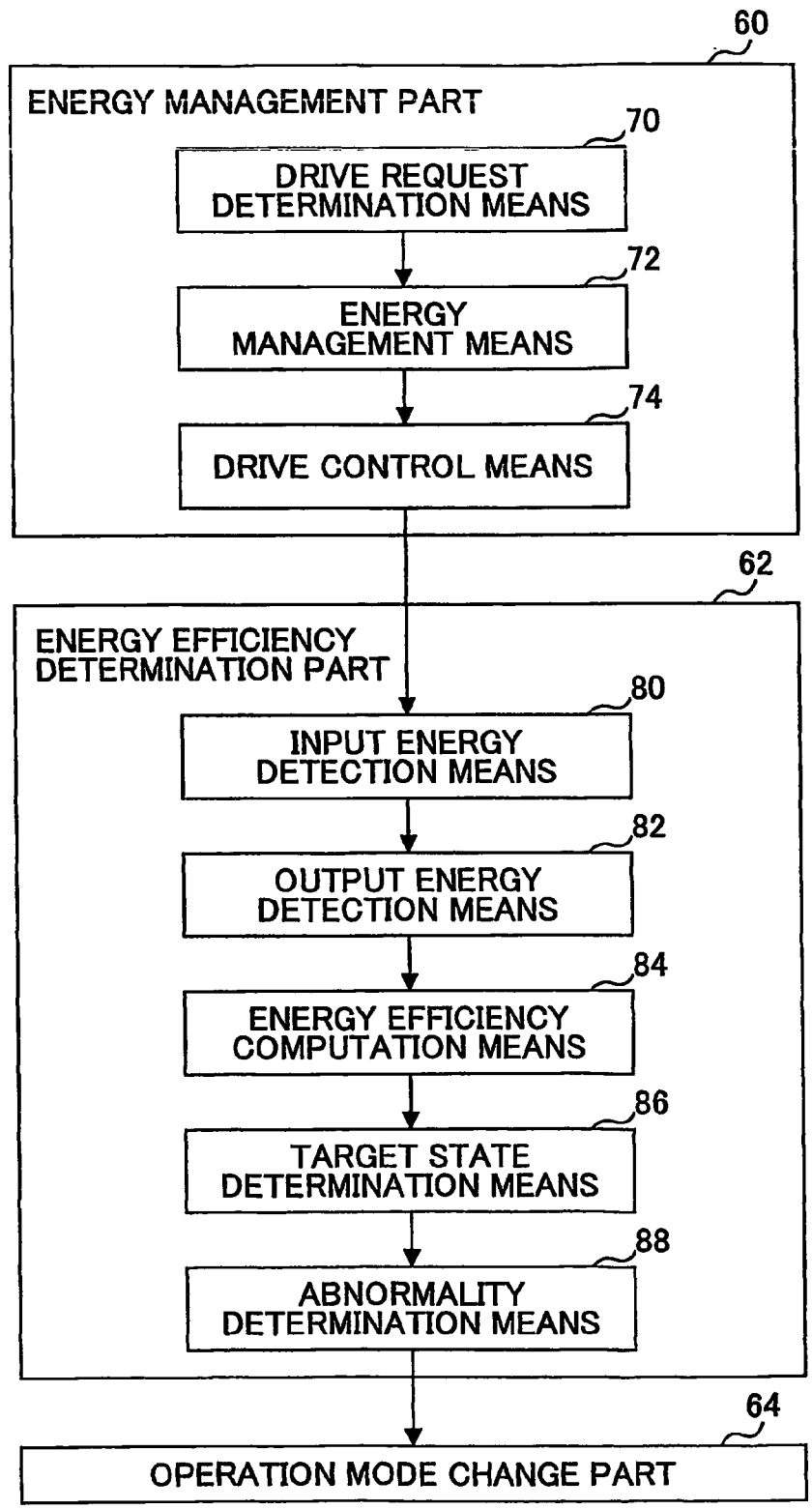
FIG. 3 is a functional block diagram of a software structure of the ECU.

FIG. 3 is a functional block diagram of a software structure of the ECU 18. The ECU 18 comprises an energy management part 60, an energy efficiency determination part 62 and an operation mode change part 64.

The energy management part 60 comprises an operation request determination means 70, an energy management means 72 and a drive control means 74. The operation request determination means 70 is a part that determines an operation request to a vehicle so as to satisfy the above-mentioned driver instruction and vehicle state. The operation request contains an amount of acceleration, an amount of decelerations, an amount of turning of a vehicle, etc.

The energy management means 72 calculates a desired mechanical power DMP that satisfies the above-mentioned operation request with respect to the actuator 10, and determines an electric power as an required electric power REP that is required for achieving the calculate desired mechanical power DMP. The drive control means 74 drives the actuator 10 so as to achieve the desired mechanical power DMP finally determined by the energy management means 72.

On the other hand, the energy efficiency determination part 62 comprises, as shown in FIG. 3, an input energy detection means 80, an output energy detection means 82, an energy efficiency calculation means 84, a target state determination means 86 and an abnormality determination means 88.

The input energy detection means 80 detects the input energy Ein supplied to the actuator 10 from the energy source 14 by using the input energy sensors 40 and 42. The output energy detection means 82 detects the output energy Eout output from the actuator 10, i.e., an energy consumed by the actuator 10, by using the output energy sensors 44 and 46. The energy efficiency operation means 84 calculates an energy efficiency $\gamma$ by dividing a detection value of the output energy Eout by a detection value of the input energy Ein.

The target state determination means 86 determines whether or not the calculated value (actual value) of the energy efficiency γ is in a target state (desired state) when a degree of achievement of the operation request is equal to or greater than a specified value. Specifically, when the degree of achievement of the operation request is equal to or greater than the specified value, and the calculated value of the energy efficiency γ is substantially equal to an upper limit value and equal to or greater than a specified value, the target state determination means 86 determines that the calculated value of the energy efficiency γ is in the target state. Further, the target state determination means 86 determines whether or not there is any restriction to improve the energy efficiency γ for requests from other performances, when the degree of achievement of the operation request is equal to or greater than the specified value and the calculated value of the energy efficiency γ is not substantially equal to the upper limit value. If there is no restriction, the target state determination means 86 determines that it is necessary to change the operation mode of the actuator 10.

The abnormality determination means 88 determines that an energy transmission system of the vehicle is abnormal when the degree of achievement of the operation request is equal to or greater than the specified value and the calculated value of the energy efficiency γ is substantially equal to the upper limit value and smaller than the specified value. If the actuator 10 is an engine and objects of detection by the output energy sensors 44 and 46 are wheels, the energy transmission system corresponds to a drive system that mechanically links the engine and the wheels.

The operation mode change section 64 changes the operation mode of the actuator 10 into the sense with which the actual value of the energy efficiency γ approaches the target value unless there is any restriction from other performances when the degree of achievement of the operation request is equal to or greater than the specified value but the calculated value of the energy efficiency γ is not substantially equal to the upper limit value.

Figure 4:
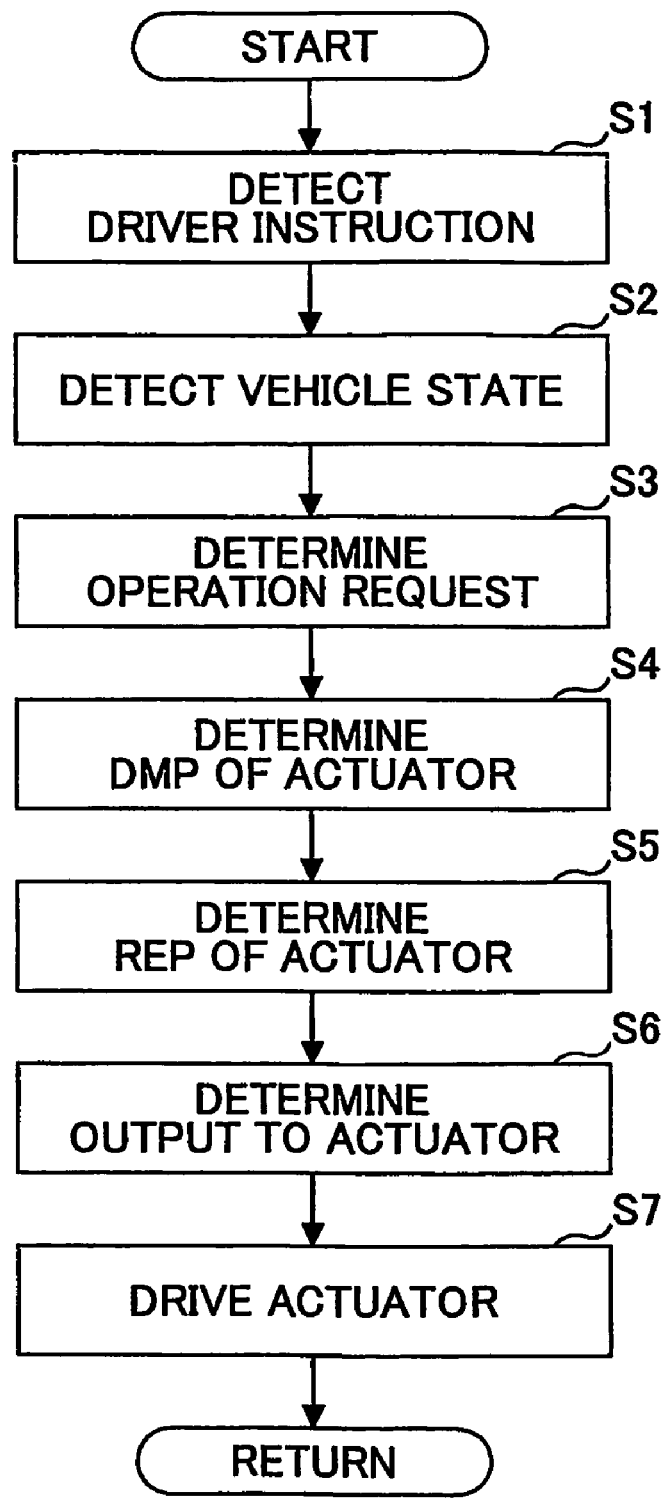
FIG. 4 is a flowchart of an operation according to an energy management program.

FIG. 4 is a flowchart of an operation according to the energy management program stored in the ROM 24. The execution of the energy management program is repeated during the computer 20 is turned on.

Each time the energy management program is executed, first in step S1, the driver instruction sensor 16*a* detects the driver instruction. Then, in step S2, the vehicle state sensor 16*b* detects the state of the vehicle.

Thereafter, in step S3, the operation request to the vehicle is determined based on the detected driver instruction and the detected vehicle state. The operation request includes a request for driving the vehicle in accordance with the driver instruction and a request for automatically driving the vehicle so as to improve the safety of the vehicle. An example of the latter request is an automatic braking to automatically perform a braking operation when a distance between the own vehicle and a front vehicle ahead of the vehicle is not appropriate in relation to a current speed of the own vehicle.

Then, in step S4, a mechanical power MP necessary for achieving the determined operation request with respect to the actuator 10 is calculated as the desired mechanical power DMP. For example, if the determined operation request is to increase the vehicle velocity from 0 km/h to 100 km/h in 0.25 minutes by accelerating a vehicle having a weight of 1 ton with an acceleration of 0.2 G, a desired mechanical power DMPmtr of a vehicle motor of the vehicle is calculated as a product, which is about 54 kW, of a drive force F (a product of the weight and the acceleration of the vehicle) and the vehicle velocity V. Additionally, if the determined operation request is to cause the vehicle having a weight of 1 ton to run at a vehicle velocity of 100 km/h against a coasting deceleration of about 0.05 G, the desired mechanical power DMPmtr is calculated as 14 kW.

It should be noted that a mechanical power MP of a motor is generally calculated as a product of a torque T and a revolution speed N, and an electric power EP is calculated as a product of a voltage E applied to a motor and a current I flowing in the motor. If the energy loss in the motor is disregarded, the mechanical power MP and the electric power EP are equal to each other.

Thereafter, in step S5, an electric power EP necessary for achieving the calculated desired mechanical power DMP is calculated as a required electric power REP with respect to the actuator 10. Then, in step S6, a voltage to be applied and a current to be supplied to the actuator 10 are determined based on the determined required electric power. That is, an output to the actuator 10 is determined.

Thereafter, in step S7, the actuator 10 is driven in accordance with the determined voltage and current. Thus, one execution of the energy management program is completed.

As apparent from the above description, a part of the computer 20 executing the energy management program constitutes the energy management part 60, a part of the computer 20 executing the process of steps S1 through S3 constitutes the operation request determination means 70, a part of the computer 20 executing the process of steps S4 through S6 constitutes the energy management means 72, and a part of the computer 20 executing the process of step S7 constitutes the drive control means 74.

Figure 5:
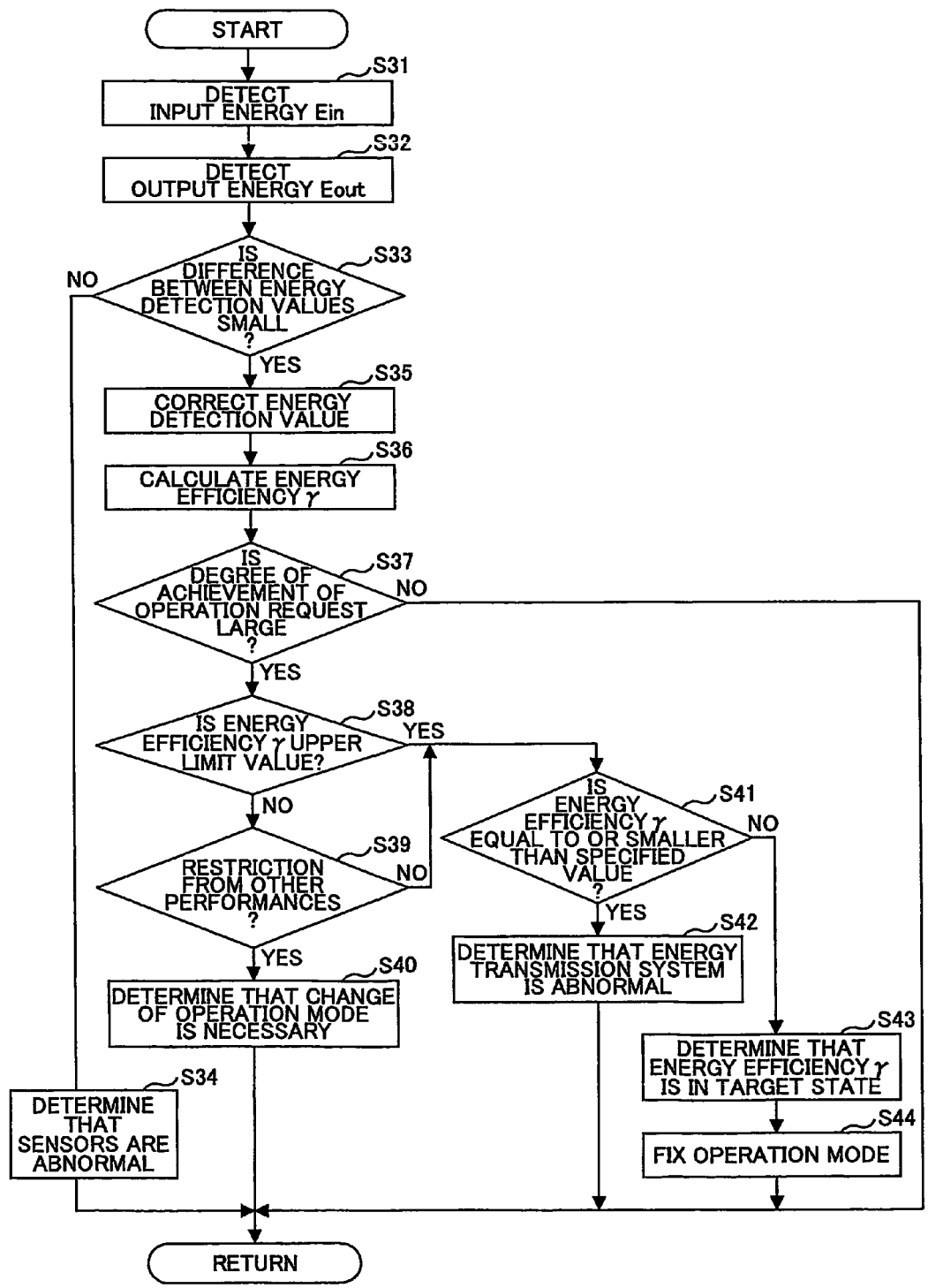
FIG. 5 is a flowchart of an operation according to an energy efficiency determination program.

FIG. 5 is a flowchart of an operation according to the energy efficiency determination program.

When the energy efficiency determination program is executed, first in step S31, each of the input energy sensors 40 and 42 detects the input energy Ein, and, thereby, two energy detection values are acquired. Then, in step S32, each of the output energy sensors 44 and 46 detects the output energy Eout, and, thereby, two energy detection values are acquired.

Then, in step S33, it is determined whether or not a difference between the acquired two energy detection values is equal to or smaller than a specified value with respect to the input energy Ein and the output energy Eout, respectively. At this time, if the difference is greater than the specified value with respect to either the input energy Ein or the output energy Eout, the determination of step S33 is negative (NO) and it is determined, in step S34, that a sensor abnormality occurs, and the execution of the energy efficiency determination program at this time is ended.

On the other hand, if the above-mentioned difference is equal to or smaller than the specified value with respect to both the input energy Ein and the output energy Eout, the determination of step S33 is affirmative (YES), and the acquired energy values are corrected with respect both the input energy Ein and the output energy Eout. The correction of the energy detection values can be performed according to various methods.

For example, if there is an inherent difference in the detection accuracy between the two energy sensors 40 and 42, the detection value of one of the sensors 40 and 42 having a lower accuracy is corrected based on the detection value of the other of the sensors 40 and 42 having a higher accuracy. On the other hand, if there is little difference between the detection accuracy between the two input energy sensors 40 and 42, and if the two sensors detects the same kind of physical amount, an average value of the detection values of the two sensors 40 and 42 is supposed to be a true detection value common the input energy sensors 40 and 42.

In step S35, a correction similar to the above-mentioned correction are performed also with respect to the detection values of the two output energy sensors 44 and 46.

Thereafter, the energy efficiency γ of the actuator 10 is calculated, in step S36, by dividing the corrected detection value of the output energy Eout by the corrected detection value of the input energy Ein. An example of the energy efficiency γ is a power ratio which is acquired by dividing the power of the actuator 10 by an input electric power to the actuator 10.

Then, in step S37, it is determined whether or not the degree of achievement of the operation request is equal to or greater than a specified value. Specifically, it is determined whether or not a difference between the operation request (described as, for example, fore, position, velocity or acceleration), which has been determined by the execution of the energy management program and the vehicle state detected by the vehicle state sensor 16b is equal to or smaller than a setting value. Here, the operation request corresponds to a target output for the actuator 10. On the other hand, the detection value of the vehicle state is an actual output for the actuator 10.

On the assumption that the degree of achievement of the operation request is not equal to or greater than the specified value, the determination of step S37 is negative (NO), and the execution of the energy efficiency determination program at this time is ended immediately. That is, if the degree of achievement of the operation request is not equal to or greater than the specified value, the process for improving the energy-efficiency γ is omitted, which results in that the achievement of the operation request is given a priority due to an improvement in the energy efficiency γ.

On the other hand, if it is assumed that the degree of achievement of the operation request is equal to or greater than the specified value, the determination of step S37 is affirmative (YES), and the routine proceeds to step S38. In step S38, it is determined whether or not the calculated value of the energy efficiency γ is substantially an upper limit value. For example, it is determine whether or not it is theoretically possible to increase the energy efficiency γ to a value greater than the calculated value. At this time, if it is assumed that the operation value of the energy efficiency γ is not the upper limit value, the determination of step S37 is negative (NO), and the routine proceeds to step S39.

In step S39, it is determined whether or not there exists a restriction to the improvement in the energy efficiency γ due to a request from other performances. For example, if the operation mode of the actuator 10 is changed in a state where behavior of the vehicle is unstable, a difference between the actual output of the actuator 10 and the operation request may increase. Therefore, when the stability of a vehicle is high enough, the operation mode should be changed. Thus, even if it is theoretically possible to improve the energy efficiency γ, there may be a case that it is not appropriate in practice. It should be noted that the determination as to whether or not a stability of a vehicle is high enough can be made by determining whether or not conditions relating to turning, braking and controlling of the vehicle are established cumulatively.

An example of the condition relating to turning of a vehicle can be a condition that is established when a side acceleration of the vehicle is equal to or smaller than a specified value or a rate of an operation of a steering wheel by a driver is equal to or smaller than a specified value.

An example of the condition relating to braking of a vehicle can be a condition that is established when a vehicle deceleration during a braking operation is equal to or smaller than a specific value or a rate of operation of a brake operation member by a driver is equal to or smaller than a specified value.

An example of the conditions relating to controlling a vehicle can be a condition that is established when none of vehicle an antilock control device, a vehicle stability control device, a traction control device and a brake assist control device provided on the vehicle as vehicle control devices, is not in operation. As a request from other performances, there is a request from an emission control standard since when the actuator 10 is an engine that takes out a mechanical energy by combusting a fuel and if there are control parameters such as a fuel injection amount, an intake air amount, a valve lift amount, a valve lift timing, and an ignition timing, a composition of emission may change due to values of those parameters.

Figure 6:
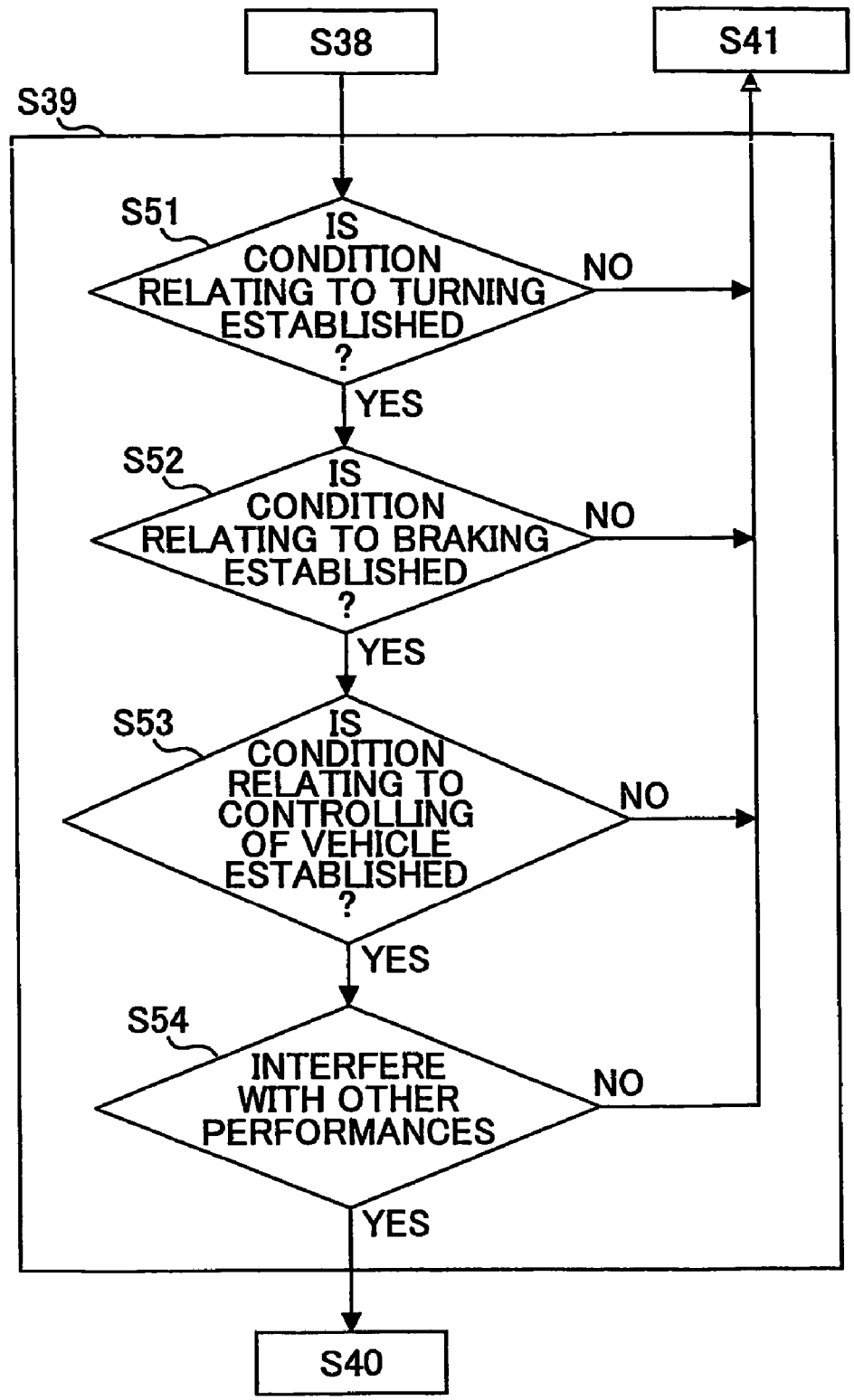
FIG. 6 is a flowchart of a process of step S39 shown in FIG. 5.

Therefore, even if an improvement in the energy efficiency γ is theoretically possible, there may be a case that is not possible to achieve such an improvement in practice. The process of step S39 is provided to solve such a problem. FIG. 6 is a flowchart of the process of step S39.

First, in step S51, it is determined whether or not the condition relating to turning is established. If the condition is established, the routine proceeds to step S52 where it is determined whether or not the condition relating to braking is established. If the condition relating to braking is established, the routine proceeds to step S53 where it is determined whether or not the condition relating to controlling the vehicle is established. If the condition relating to controlling is established, the routine proceeds to step S54 where it is determined whether or not the improvement in the energy efficiency γ interferes with other performances. If the improvement in the energy efficiency γ does not interfere with other performances, the determination of step S39 is affirmative (YES), and the routine proceeds to step S40.

On the other hand, if any one of the four conditions is not established, the determination of step S39 is negative (NO), and the routine proceeds to step S41. Assuming that the improvement in the energy efficiency γ can be achieved both theoretically and practically, the determination of step S39 is affirmative (YES), and the routine proceeds to step S40 where it is determined that it is necessary to change the operation mode of the actuator 10 so as to improve the energy efficiency γ. In this case, thereafter, the operation mode change program is executed by the computer 20. Contents of the operation mode change program will be described later.

As mentioned above, the execution of the energy efficiency determination program is completed.

In the above-mentioned case, the calculated value of the energy efficiency γ is not equal to the upper limit value, that is, the improvement of the energy efficiency γ is possible theoretically. On the other hand, if the calculated value of the energy efficiency γ is substantially equal to the upper limit value, that is if the improvement of the energy efficiency γ is impossible theoretically, the determination of step S38 is affirmative (YES), and the routine proceeds to step S41. In step S41, it is determined whether or not the calculated value of the energy efficiency γ is equal to or smaller than a specified value.

At this time, assuming that the calculated value is equal to or smaller than the specified value, the determination of step S41 is affirmative (YES), and the routine proceeds to step S42 where it is determined that an energy transmission system is abnormal.

On the other hand, if it is assumed that the calculated value of the energy efficiency γ is larger than the specified value, the determination of step S41 is negative (NO), and the routine proceeds to S43 where it is determined that the calculated value of the energy efficiency γ is in the target state (ideal state). Thereafter, in step S44, it is determined that the current operation mode is appropriate for the actuator 10 in view of the achievement of the operation request and maximization of the energy efficiency γ, and, thus, the operation mode of at least next time is fixed to the current operation mode.

In any case, the execution of the energy efficiency determination program at this time is completed.

As apparent from the above description, a part of the computer 20 which execute the energy efficiency determination program constitutes the energy efficiency determination part 62; a part of the computer 20 which performs the process of steps S31 and S33 through S35 shown in FIG. 5 constitutes the input energy detection part 80; a part of the computer 20 which performs the process of steps S32 through S35 constitutes the output energy detection means 82; a part of the computer 20 which performs the process of step S36 constitutes the energy efficiency calculation means 84; a part of the computer 20 which performs the process of steps S37 through S39, S43 and S44 constitutes the target state determination means 86; and a part of the computer 20 which performs the process of steps S37 through S39, S41 and S42 constitutes the abnormality determination means 88.

It should be noted that although the operation mode of the actuator 10 is changed so as to attempt an ideal increase in the energy efficiency γ on the assumption that the operation request is sufficiently achieved in view of the fact that the actuator 10 relates to the vehicle motion in the present embodiment, if, for example, the actuators 10 is an actuator relating to comfort of passengers in the vehicle such as an actuator of an air-conditioner, is possible to achieve the present invention by changing the operation mode of the actuator 10 so that requirements from the passengers regarding comfort are sufficiently satisfied on the assumption that an ideal increase in the energy efficiency γ is achieved.

FIG. 7 is a flowchart of an operation according to the operation mode change program.

In the operation mode change program, first in step S71, a control parameter, which can improve the energy efficiency γ without substantially changing an actual output of the actuator 10, is selected as a focused control parameter X from among a plurality of control parameters that could give influences to the energy efficiency γ of the actuator 10. For example, if the actuator 10 relates to an engine output, parameters indicating an operational state of the engine, such as, for example, a fuel injection amount, an intake air amount, a valve lift amount, a valve timing and an ignition timing, are selected as candidates of the focused control parameter. Among those, a control parameter that can improve the energy efficiency γ of the actuator 10 while satisfying a request to the engine is selected as the focused control parameter X.

Then, in step S72, the selected focused control parameter X is corrected by adding a correction value ΔX to the current value of the selected focused control parameter X.

Subsequently, in step S73, the energy efficiency γ when the corrected focused control parameter X is adopted is predicted.

Thereafter, in step S74, it is determined whether or not the predicted value is greater than the current value of the energy efficiency γ, that is whether or not there is a possibility of improving the energy efficiency γ. On the assumption that there is no possibility of improvement, the determination of step S74 is negative (NO), and the routine proceeds to step S75 where the focused control parameter X is corrected by subtracting a correction value ΔX from the current value of the focused control parameter X. Then, the routine proceeds to step S73.

In step S73, an energy efficiency γ when adopting the corrected focused control parameter X is predicted in the same manner as mentioned above. Thereafter, in step S74, it is determined whether the energy efficiency γ can be improved by adopting the correction. At this time, it is assumed that the there a possibility of an improvement, the determination of step S74 is affirmative (YES), and the routine proceeds to step S76.

As mentioned above, by performing the process of steps S72 through S75, a direction (increase or decrease) of correction of the focused control parameter X so as to improve the energy efficiency γ is determined.

Thereafter, in step S76, according to the determined direction of correction, a correction amount to improve the energy efficiency γ to be the upper limit value (maximum value) is predicted, and, as a result, the value of the focused control parameter is determined finally.

Then, the execution of the operation mode change program at this time is completed.

As apparent from the above description, a part of the computer 20 which executes the operation mode change program constitutes the operation mode change part 64. Additionally, in the present embodiment, the energy management part 60 constitutes an operation part, the energy efficiency determination part 62 constitutes an acquiring part, and the operation mode change part 64 constitutes a change part.

Further, in the present embodiment, an automobile or vehicle corresponds to a machine, the energy source 14 corresponds to a supply part that supplies an energy, and the actuator 10 corresponds to a consume part that consumes the energy supplied by the supply part.

Furthermore, in the present embodiment, a part of the computer 20 which performs the process of steps S37 and S40 shown in FIG. 5 constitutes a first change permission/prohibition means, and a part of the computer 20 which performs the process of steps S38 and S40 constitutes a second change permission/prohibition means.

Furthermore, in the present embodiment, the energy management program of FIG. 4 constitutes an operation process, the energy efficiency determination program of FIG. 5 constitutes an acquisition process, and the operation mode change program of FIG. 7 constitutes a change process.

The present invention is not limited to the specifically disclosed embodiments, and variations and modifications may be made without departing from the scope of the present invention.

The invention claimed is:

1. An energy management apparatus that manages energy consumed in a machine having a supply part that supplies an energy and a plurality of consume parts that consume the energy supplied by the supply part, each consume part of the plurality of consume parts having an input energy sensor and an output energy sensor, said energy management apparatus comprising:

an operating part that operates the plurality of consume parts by using the energy supplied by said supply part;
an acquisition part that acquires, for each of the plurality of consume parts, an energy conversion characteristic, as an energy efficiency, from the input energy sensor detecting an input energy supplied to each consume part and the output energy sensor detecting an output energy output from each consume part, the energy efficiency of each consume part being calculated by dividing a detection value of the output energy sensor by a detection value of the input energy sensor;

a target state determination part that determines a target state based on the energy efficiency and an achievement of an operation request to generate a determination result;

a change part that changes an operating condition of each consume part based on the energy efficiency and the determination result so as to improve an actual value of the energy efficiency;

a determination part that determines that an energy transmission system of said machine is abnormal when the energy efficiency of at least one of the plurality of consume parts is equal to or smaller than a specified value; and a specified value change part included as part of the change part that changes the specified value of the energy efficiency into the actual value of the energy efficiency when the actual value of the energy efficiency is larger than the specified value of the energy efficiency.

2. The energy management apparatus as claimed in claim 1, further comprising first change permission/prohibition means for permitting said change part to change said operating condition when at least one condition is established cumulatively, and for prohibiting a change of said operating condition when the at least one condition is not established, wherein the at least one condition includes a condition that a difference between the operation request to each consume part and an actual output from each consume part is equal to or smaller than a specified value.

3. The energy management apparatus as claimed in claim 1, further comprising second change permission/prohibition means for permitting or prohibiting said change part to change said operating condition in accordance with the energy efficiency.

4. The energy management apparatus as claimed in claim 3, further comprising means for permitting said second change permission/prohibition means to change said operating condition when at least one condition is established, and for prohibiting a change of said operating condition when the at least one condition is not established, wherein the at least one condition includes a condition that the energy efficiency is not equal to an upper limit value at which there is substantially no room for improvement.

5. The energy management apparatus as claimed in claim 1, wherein said machine includes an operating part that is operated by at least one of the plurality of consume parts, and said acquisition part includes output energy acquisition means for acquiring the output energy in accordance with an amount of operation of the operating part, wherein said determination part is provided between the at least one of the plurality of consume parts and said operating part.

6. The energy management apparatus as claimed in claim 5, wherein said determination part includes means for determining that said energy transmission system is abnormal when a plurality of conditions including a condition that said energy efficiency is at an upper limit value where there is substantially no room for improvement and a condition where the energy efficiency is equal of or smaller than the specific value.

7. The energy management apparatus as claimed in claim 1, wherein said machine is a movable body, and the plurality of consume parts includes at least one of an actuator being associated with driving of the movable body, an actuator being associated with braking of the movable body and an actuator being associated with changing of a moving direction of the movable body.

8. The energy management apparatus as claimed in claim 1, wherein the plurality of consume parts includes a plurality of actuators so that said supply part supplies energy commonly to the plurality of actuators, and said operating part includes means for calculating a target value necessary for an operation of each of the actuators while adopting a power or work as a unit common to other actuators.

9. The energy management apparatus as claimed in claim 1, further comprising an operation request determining device that determines the operation request to at least one of the plurality of consume parts, and wherein said operating part includes means for operating the at least one of the plurality of consume parts in accordance with the operation request determined by said operation request determining device.

10. The energy management apparatus as claimed in claim 9, wherein said operation request determining device includes:

information detector that detects operation information containing at least one of an instruction made by a driver operating the at least one of the plurality of consume parts, an operational state of the at least one of the plurality of consume parts and an operation circumstance of the at least one of the plurality of consume parts; and operation request determination means for determining said operation request in accordance with the operation information detected by said information detector.

11. The energy management apparatus as claimed in claim 1, wherein said change part changes the operating condition of each consume part in accordance with the energy efficiency so that the actual value of the energy efficiency becomes equal to an upper limit value at which there is substantially no room for improvement.

12. The energy management apparatus as claimed in claim 1, wherein said change part changes the operating condition of each consume part in accordance with the energy efficiency so that the actual value of the energy efficiency becomes equal to an upper limit value at which there is substantially no room for improvement and greater than a specified value.

13. An energy management method of managing energy consumed in a machine having a supply part that supplies an energy and a plurality of consume parts that consume the energy supplied by the supply part, each consume part of the plurality of consume parts having an input energy sensor and an output energy sensor, said energy management method comprising:

operating the plurality of consume parts by using the energy supplied by said supply part;

acquiring an energy conversion characteristic, for each of the plurality of consume parts, as an energy efficiency, from the input energy sensor detecting an input energy supplied to each consume part and the output energy sensor detecting an output energy output from each consume part, the energy efficiency of each consume part being calculated by dividing a detection value of the output energy sensor by a detection value of the input energy sensor;

determining a target state based on the energy efficiency and an achievement of an operation request to generate a determination result;

changing an operating condition of each consume part based on the energy efficiency and the determination result so as to improve an actual value of the energy efficiency;

determining that an energy transmission system of said machine is abnormal when the energy efficiency of at least one of the plurality of consume parts is equal to or smaller than a specified value; wherein the changing includes a specified value changing that changes the specified value of the energy efficiency into the actual value of the energy efficiency when the actual value of the energy efficiency is larger than the specified value of the energy efficiency.

14. The energy management apparatus as claimed in claim 1, wherein the determination result includes a determination of whether a degree of achievement of the operation request is equal to or greater than the specified value.

15. The energy management apparatus as claimed in claim 14, wherein if the degree of achievement of the operation request is less than the specified value, the energy management apparatus ends execution of an energy efficiency determination, and if the degree of achievement of the operation request is equal to or greater than the specified value, the energy management apparatus determines whether it is possible to increase the energy efficiency.

16. The energy management apparatus as claimed in claim 2, wherein the at least one condition established cumulatively includes:
   a turning condition;
   a braking condition;
   an antilock condition;
   a vehicle stability condition;
   a traction condition;
   a brake assist condition; and
   an emission control condition.

17. The energy management apparatus as claimed in claim 1,
   wherein the energy transmission system of said machine is abnormal when an energy efficiency of each consume part is equal to an upper-limit value, the upper limit value has substantially no room for improvement and an acquired energy efficiency is equal to or smaller than the specified value.

18. The energy management apparatus as claimed in claim 1,
   wherein the target state determination part determines that the actual energy efficiency of the machine is in the target state when a degree of the achievement of the operation request is equal to or greater than the specified value and the actual energy efficiency of the machine is substantially equal to an upper limit value and equal to or greater than a second specified value.

19. The energy management apparatus as claimed in claim 1, wherein the determination part further determines that there is a restriction to improve the actual energy efficiency based on a degree of the achievement of the operation request and the difference between the actual energy efficiency and an upper limit value, and
   the change part changes an operating condition of each consume part only when the determination part determines that there is not a restriction.

20. The energy management apparatus as claimed in claim 1, further comprising an operation mode change part that selects a control parameter of at least one of the plurality of consume parts and makes an adjustment to the control parameter in a first direction and a second direction to determine if the energy efficiency of the at least one of the plurality of consume parts can be improved by the adjustment.

21. The energy management method as claimed in claim 13, further comprising:
   selecting a control parameter of each consume part; and
   adjusting the control parameter in a first direction and second direction to determine if the energy efficiency of each consume part can be improved by the adjustment.

\* \* \* \* \*